United States Patent [19]

Gikas et al.

[11] Patent Number: 5,761,153
[45] Date of Patent: Jun. 2, 1998

[54] METHOD OF LOCATING HYDROPHONES

[75] Inventors: Vassilis Nicholas Gikas, Newcastle-upon-Tyne; Paul Anthony Cross, Whitebridge Park, both of United Kingdom; Asiama Akuamoa, Houston, Tex.

[73] Assignee: Input/Output, Inc., Stafford, Tex.

[21] Appl. No.: 671,061

[22] Filed: Jun. 27, 1996

[51] Int. Cl.$^6$ .............................. G01V 1/36; G01V 1/38
[52] U.S. Cl. .......................... 367/19; 367/99; 364/421
[58] Field of Search ........................ 367/19, 99, 106, 367/177; 364/421, 422

[56] References Cited

U.S. PATENT DOCUMENTS

| | | | |
|---|---|---|---|
| 4,777,628 | 10/1988 | Rietsch | 367/13 |
| 4,852,004 | 7/1989 | Manin | 364/421 |
| 4,858,202 | 8/1989 | Fitch et al. | 367/75 |
| 4,912,682 | 3/1990 | Norton, Jr. et al. | 367/19 |
| 4,970,696 | 11/1990 | Crews et al. | 367/15 |
| 5,019,978 | 5/1991 | Howard et al. | 364/422 |
| 5,166,905 | 11/1992 | Currie | 367/19 |
| 5,353,223 | 10/1994 | Norton et al. | 364/421 |
| 5,459,473 | 10/1995 | Dempster et al. | 342/357 |

*Primary Examiner*—Nelson Moskowitz
*Attorney, Agent, or Firm*—Tim Headley; Haynes and Boone, L.L.P.

[57] ABSTRACT

A method of computing the location of air guns and hydrophones within a seismic spread utilizes a navigation network having a plurality of stations. The network provides a plurality of navigation observations. A number of the observations consist of magnetic bearings which are used to derive the hydrophone locations. The method includes the steps of:

a. obtaining a set of observations from the network, each observation being obtained by using navigation devices whose origin system moves independent of the navigation reference point; and
b. forming a design matrix wherein the magnetic bearings are modeled based on the equation:

$$\alpha - \left[ \tan^{-1}\left( \sum_{k=2}^{n} [kc_k l^{k-1}] + \frac{\pi}{2} \right) \right] - magdecl - gridconv = B + v_B.$$

6 Claims, 8 Drawing Sheets

| | | | |
|---|---|---|---|
| VESSEL | 1 | | $\Phi$ $\lambda$ $\dot{\Phi}$ $\dot{\lambda}$ $c$ |
| FLOAT | 1 | ORIGIN | $X_{f1}$ $Y_{f1}$ $\dot{X}_{f1}$ $\dot{Y}_{f1}$ |
| | ⋮ | | |
| | m1 | ORIGIN | $X_{fm1}$ $Y_{fm1}$ $\dot{X}_{fm1}$ $\dot{Y}_{fm1}$ |
| STREAMER | 1 | ORIGIN | $X_{s1}$ $Y_{s1}$ $\dot{X}_{s1}$ $\dot{Y}_{s1}$ |
| | | ORIENT | $\alpha$ |
| | | COEF | $C_{s11}$ $C_{s11}$ $C_{s11}$ |
| | ⋮ | | |
| | m2 | ORIGIN | $X_{sm2}$ $Y_{sm2}$ $\dot{X}_{sm2}$ $\dot{Y}_{sm2}$ |
| | | ORIENT | $\alpha$ |
| | | COEF | $C_{sm2l}$ $C_{sm2n}$ |

| | VESSEL | | | FLOAT | | | | STREAMER | | | | |
|---|---|---|---|---|---|---|---|---|---|---|---|---|
| | $\phi$ | $\lambda$ | $\dot{K}$ | $X_f$ | $Y_f$ | $\dot{X}_f$ | $\dot{Y}_f$ | $X_s$ | $Y_s$ | $\dot{X}_s$ | $\dot{Y}_s$ | $\alpha$ | $c_2 \ldots c_n$ |
| | . | . | . | . | . | . | . | . | . | . | . | . | . |
| | . | . | . | . | . | . | . | . | . | . | . | . | . |
| $B_i$ | $A_{i1}$ | $A_{i2}$ | $A_{i3}$ | $A_{i4}$ | $A_{i5}$ | $A_{i6}$ | $A_{i7}$ | $A_{i8}$ | $A_{i9}$ | $A_{i10}$ | $A_{i11}$ | $A_{i12}$ | $A_{i13}$ | $A_{i14}$ | $A_{i14+n}$ |
| | . | . | . | . | . | . | . | . | . | . | . | . | . |
| | . | . | . | . | . | . | . | . | . | . | . | . | . |

(rows: 1, o, $B_i$, s, m)

UNKNOWNS

METHOD OF LOCATING HYDROPHONES

BACKGROUND OF THE INVENTION

The present invention relates to marine seismic surveying, and more particularly to a method of computing the position and quality measurements of sound sources and receivers within a seismic spread in marine geophysical surveying.

In marine seismic navigation, the basic configuration typically involves one or more vessels sailing in approximately straight lines while towing a number of streamers and sound sources (also known as "air guns") consisting of sub-arrays. The length of each streamer is typically up to 6 kilometers long. The streamers carry a number of sound receivers (also known as "hydrophones"), typically 50 to 100 per kilometer. The streamers are towed just below the surface of the water. In the course of the seismic survey, the vessel traverses along pre-defined lines, with azimuth and speed purposely selected to overlay the geologic substrata being imaged. At a specified distance or time interval, typically 20 to 25 meters and 8 to 10 seconds respectively, the air guns are activated, resulting in seismic waves which travel through the water and penetrate the earth's substrata. The times of arrival of the reflected and or refracted seismic waves by the substrata are measured by the hydrophone sensors located on the streamers. The surveying problem is to derive the position of the air guns and hydrophones at the instant of firing and reception, respectively, in order to determine the geologic features of the earth below, within the survey area.

To determine the positions of the air guns and hydrophones, the geophysical industry has used a network of a large number of navigation devices placed at known locations within the seismic spread. This results in a complex network with hundreds of observation points. Various techniques such as least squares estimation and extended sequential Kalman filter have been used in the prior art to process the observations in real-time.

One approach to the position problem is to treat each time epoch and measuring system more or less independently. For example, both laser and acoustic measurements are used to transfer the position of the vessel to the floats, while the front-end acoustics relate the floats to the air-guns and front-end of the streamer. The compasses then determine the streamer shape. The rear-end acoustics and tailbuoy positioning serve to provide some control of the orientation and stretch of the streamers. Typically, the process involves some sort of curve-fitting operation of the compasses and several independent least squares network adjustment, iterating several times through the various data types in order to best-fit in some general sense all of the observations. This approach suffers several drawbacks. The first drawback is that this approach is highly "configuration dependent". A relatively small change in the network configuration or measurement set may lead to major changes in the processing software. The second drawback is that this approach lacks the ability to analyze and quantify error propagation thoroughout the process. It is almost impossible to describe the precision and reliability of the final derived positions. The third drawback is that this approach treats each time epoch independently, discarding prior knowledge of the motion of the system. This results in a less accurate solution of the derived coordinates.

A second approach to the position problem is the "sequential extended Kalman filter" technique. This method allows mixing of different observations from the various devices in the order in which they are received, and provides a best estimate of air gun and hydrophone positions in a navigation system. Because it can determine and use the system motion, Kalman filtering is able to use observations that do not completely define the network system. This approach suffers several drawbacks. First, correlated observations such as magnetic compass azimuths cannot be sequentially processed in a Kalman filter. Second, the efficiency of the Kalman filter is largely related to the number of observations added at each new time epoch. Third, most prior approaches that use the Kalman technique do not solve for the air gun and hydrophone positions directly. Instead, positions of devices such as an acoustic node, a cable compass, and a surface reference, such as a tailbuoy, are computed. These positions are then used with corrected observations from the filter to derive a position of interest within the spread by interpolation.

These techniques are not computationally efficient, due to the fact that their efficiency is related to the number of measurements added at each new time epoch. Furthermore, the prior art techniques uncorrelate observations, such as magnetic bearings, before employing them in their solutions. The uncorrelated observations are then used to obtain best estimates of station coordinates within the seismic spread. The best estimates are then used to determine the locations of the air guns and hydrophones.

Because compasses and other measuring devices are not co-located with the hydrophones it is necessary in any method to have a mathematical model that describes the shape of the streamer. Moreover, because of the numerous hydrodynamic forces acting on the cable in the underwater environment, the cable shape is likely to be significantly distorted from a nominal straight line. To estimate this distorted shape, the prior art has used several different methods.

One such prior art method is the use of a physical model of the hydro-dynamic forces acting on the cable. It is known that tension forces due to the vessel pull, and the drag forces due to the resistance of the cable through the water, determine its three dimensional shape. Any change in the vessel's speed, and any fluctuation in the sea waves, or fluctuations generated by the vessel, the wind load or the water currents, would mean changes in the towing tension and drag forces respectively.

Such a model can be applied only when the external forces acting on the cable are known with reasonable accuracy. Even if the quantities of the external forces are known, a system of several streamers leads to mathematical models that are too complicated and inflexible for the construction and implementation of a useful algorithm for determining the positions of the air guns and the hydrophones.

Another method to estimate the distorted shape of the streamer cable when being pulled by a boat is the use of mathematical function of a cubic spline. A cubic spline gives a curve which is continuous and continuously differentiable. Although a cubic spline is capable of approximating the data, it suffers a major drawback, in that its coefficients vary along the length of the cable, and therefore cannot be represented by a single equation. Moreover, the cubic spline is hyper-sensitive to compass errors, leading to the possibility of a completely unrealistic curve.

Finally, another alternative is the use of a decorrelation technique whereby magnetic compasses are decomposed into tangential chord azimuths and distances, and their appropriate error propagations estimated, before being incorporated into the network solution. Whereas this method proves to be more realistic in terms of deriving associated error propagation parameters. derivatives of the magnetic compass measurements are used instead of the actual measured compass observations.

A need exists for an improved method to obtain the best estimated coordinates of air guns and hydrophones.

SUMMARY OF THE INVENTION

A method of computing the location of air guns and hydrophones within a seismic spread utilizes a navigation network having a plurality of stations. The network provides a plurality of navigation observations. A number of the observations consist of magnetic bearings which are used to derive the hydrophone locations. The method includes the steps of:

a. obtaining a set of observations from the network, each observation being obtained by using navigation devices whose origin system moves independent of the navigation reference point; and b. forming a design matrix wherein the magnetic bearings are modeled based on the equation:

$$\alpha - \left[ \tan^{-1}\left( \sum_{k=2}^{n} [kc_k l^{k-1}] + \frac{\pi}{2} \right) - magdecl - gridconv \right] = B + v_B.$$

In an alternate embodiment of the invention, the step of ignoring is replaced with a step of weighting spurious observations.

In another feature of the invention, an improved mathematical solution handles different types of observations in one unified system, including correlated observations such as magnetic compasses.

In another feature of the invention, it provides an efficient computing method that does not require inversion of large matrices.

In another feature of the invention, it computes directly any points of interest within the seismic spread, including air gun and hydrophone locations, without utilizing any interpolation schemes after initial computation.

In another feature of the invention, a Bayes filter processing step increases the computational efficiency of the invention, and does not depend on uncorrelated observations.

DESCRIPTION OF THE PREFERRED EMBODIMENT

Figure 1:
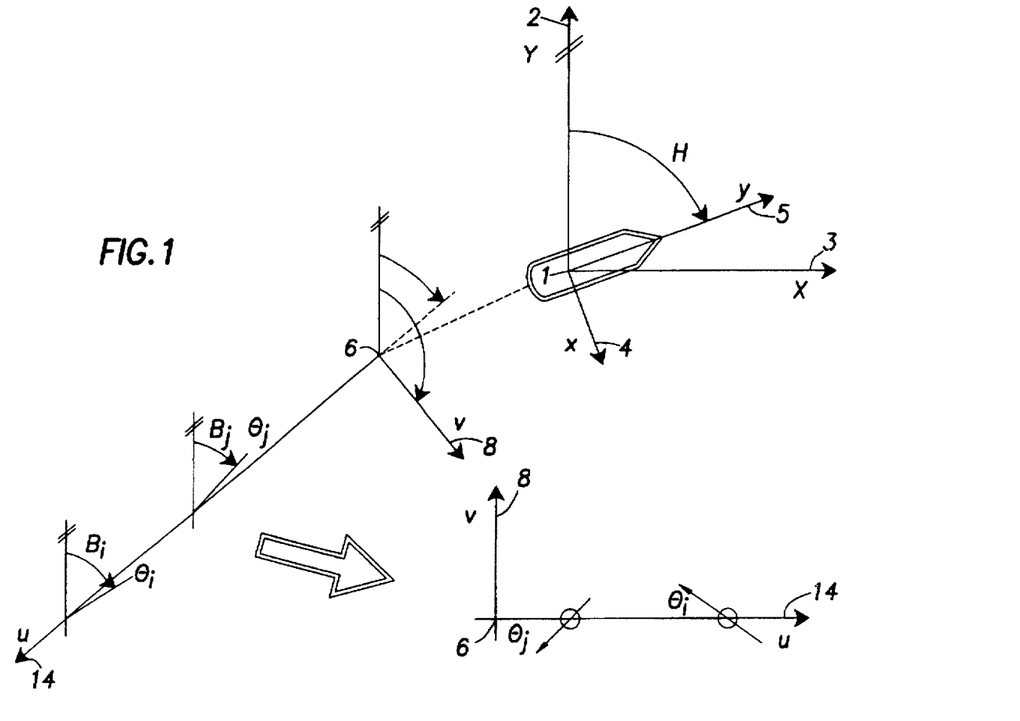
FIG. 1 depicts a first reference frame for the streamer modeling used.
Figure 2A:
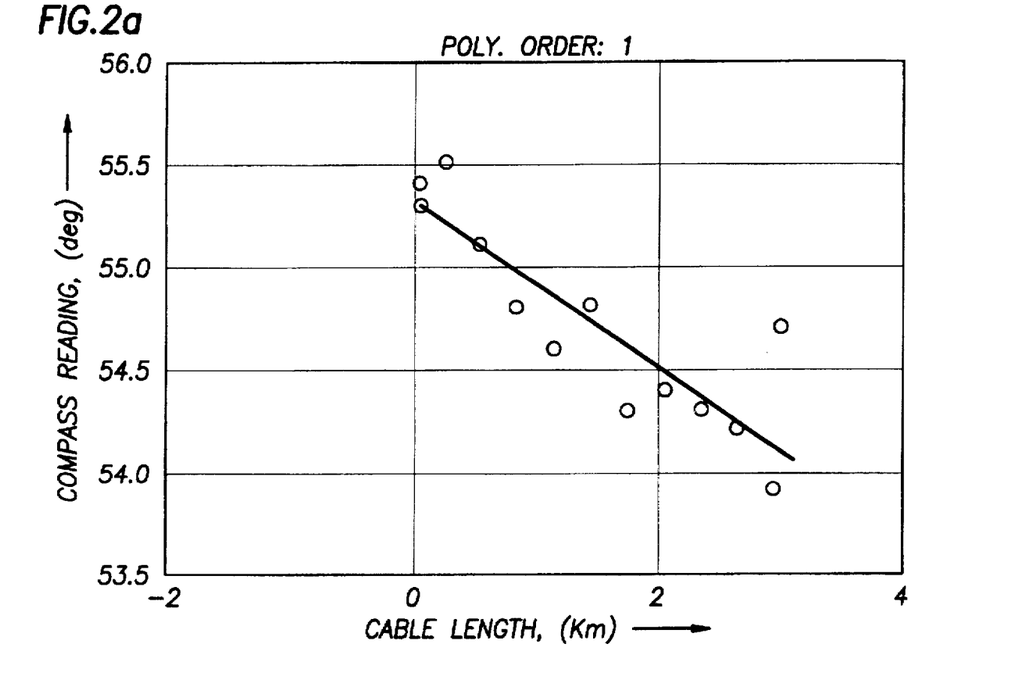
FIG. 2 depicts test results from the various polynomial streamer models.
Figure 2B:
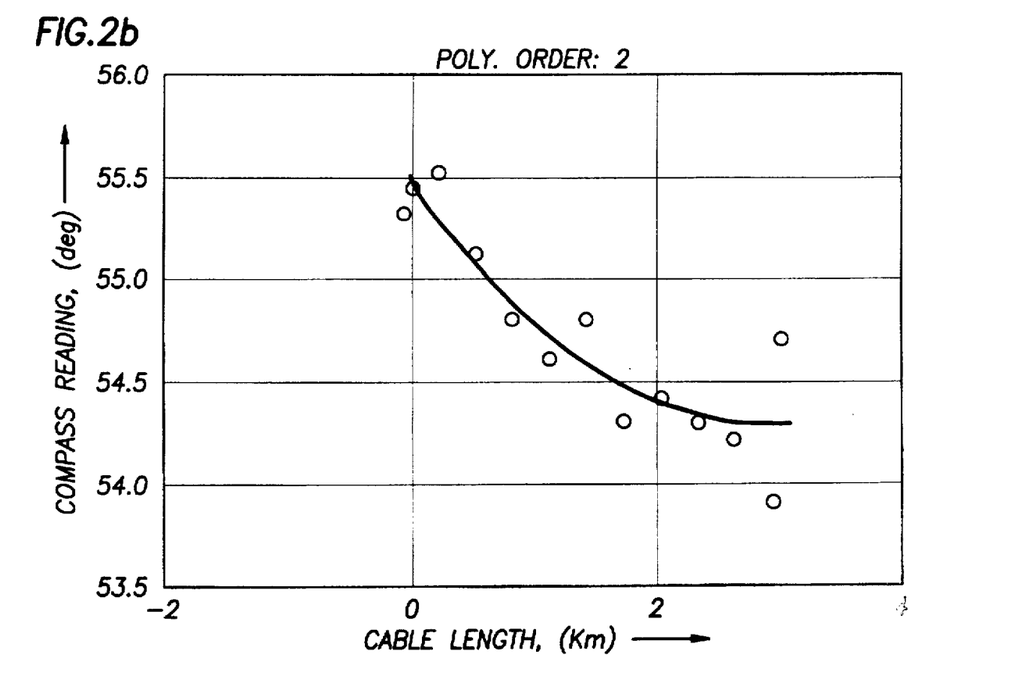
Figure 2C:
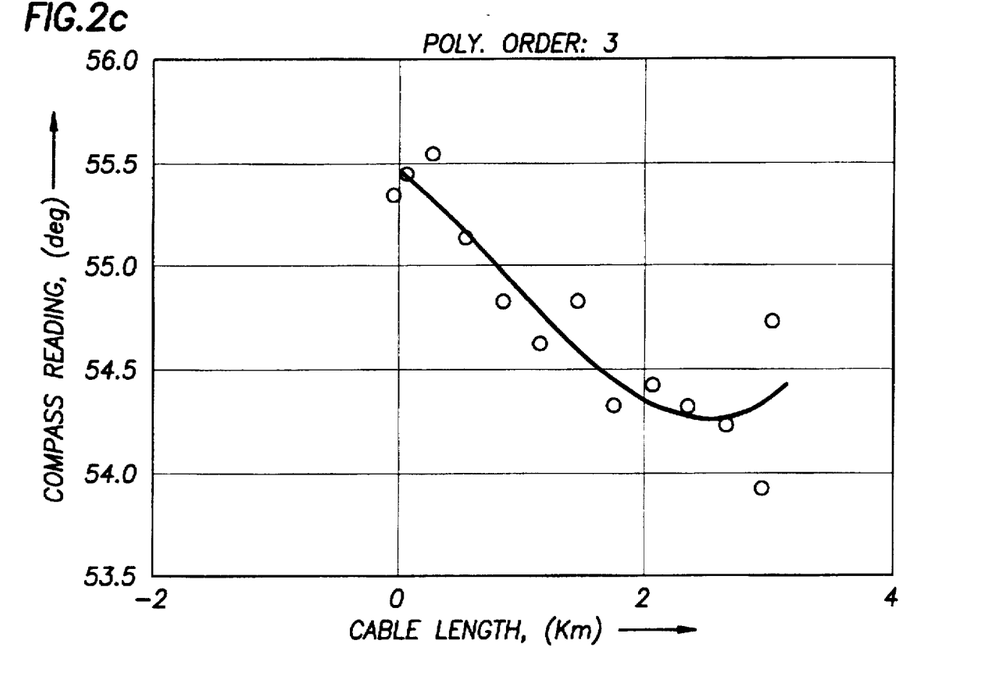
Figure 2D:
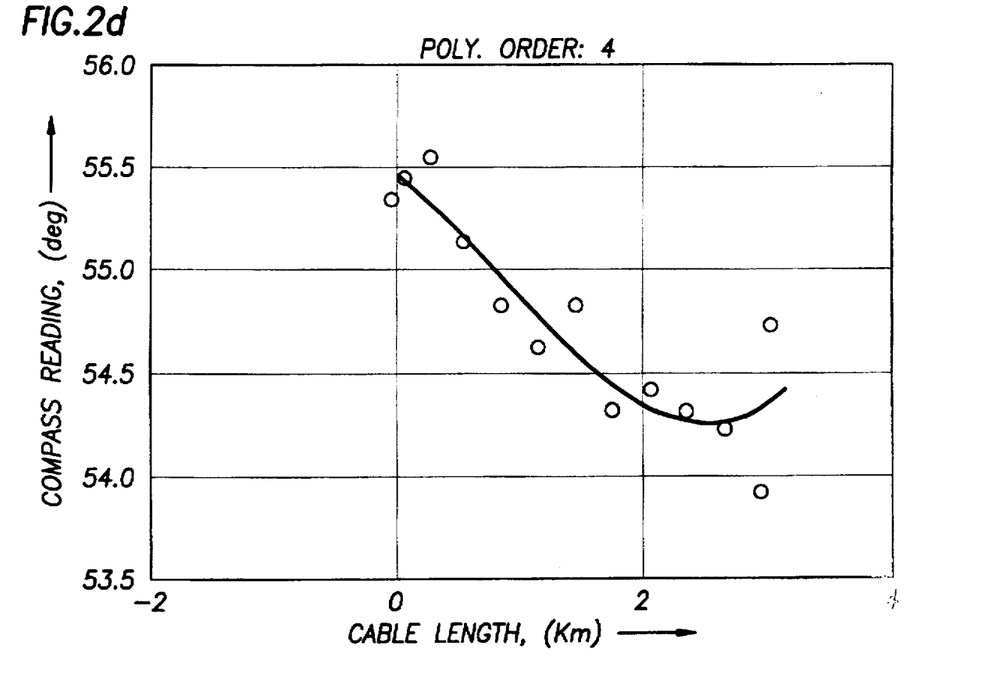
Figure 2E:
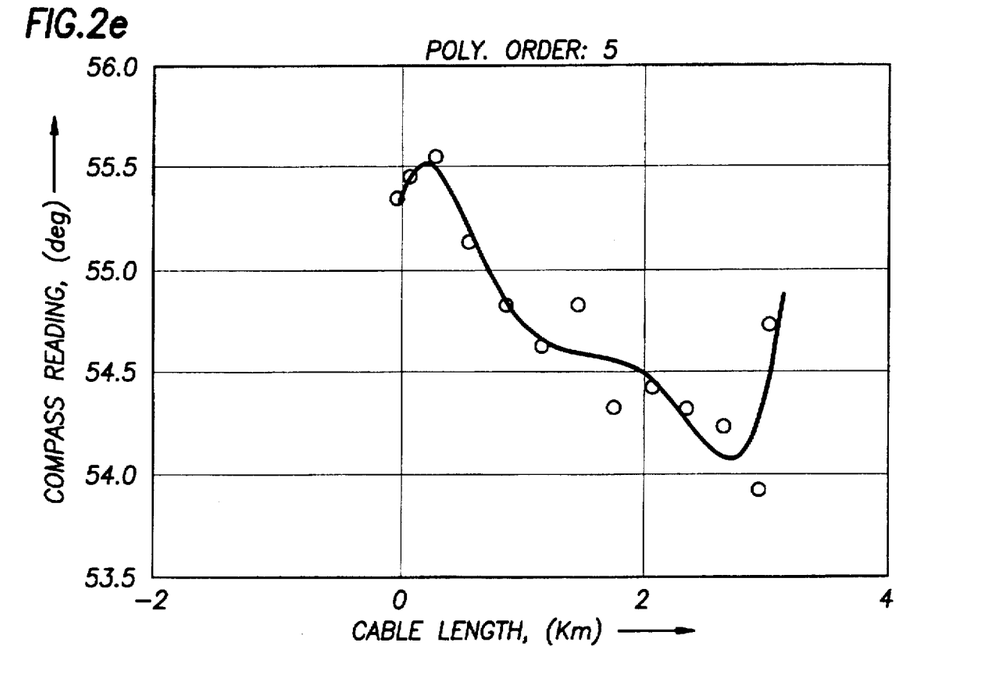
Figure 2F:
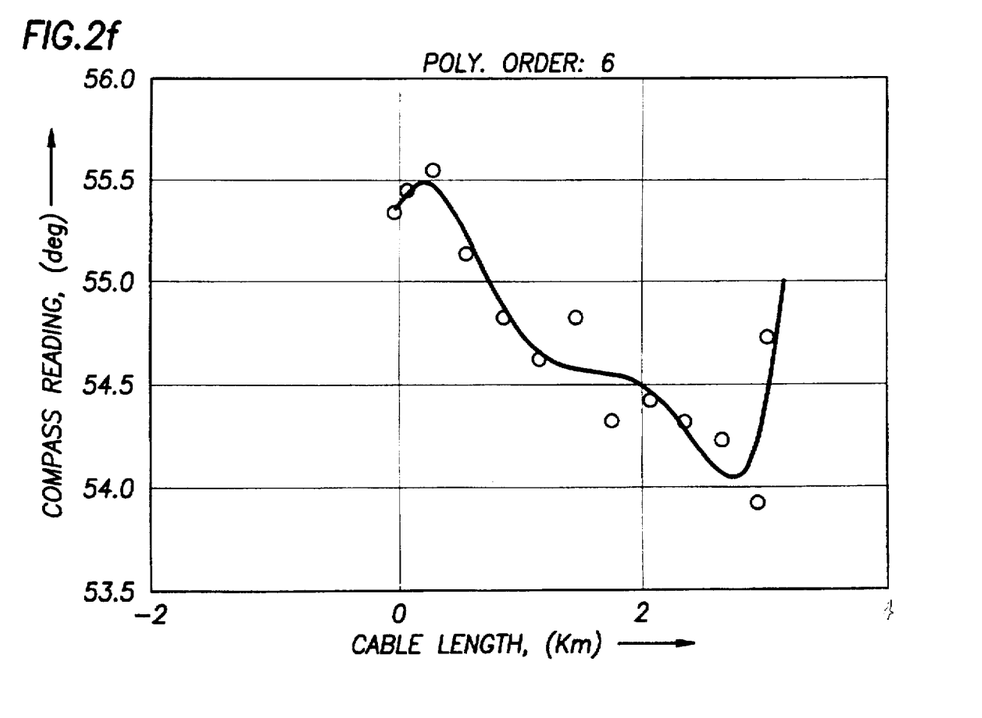
Figure 2G:
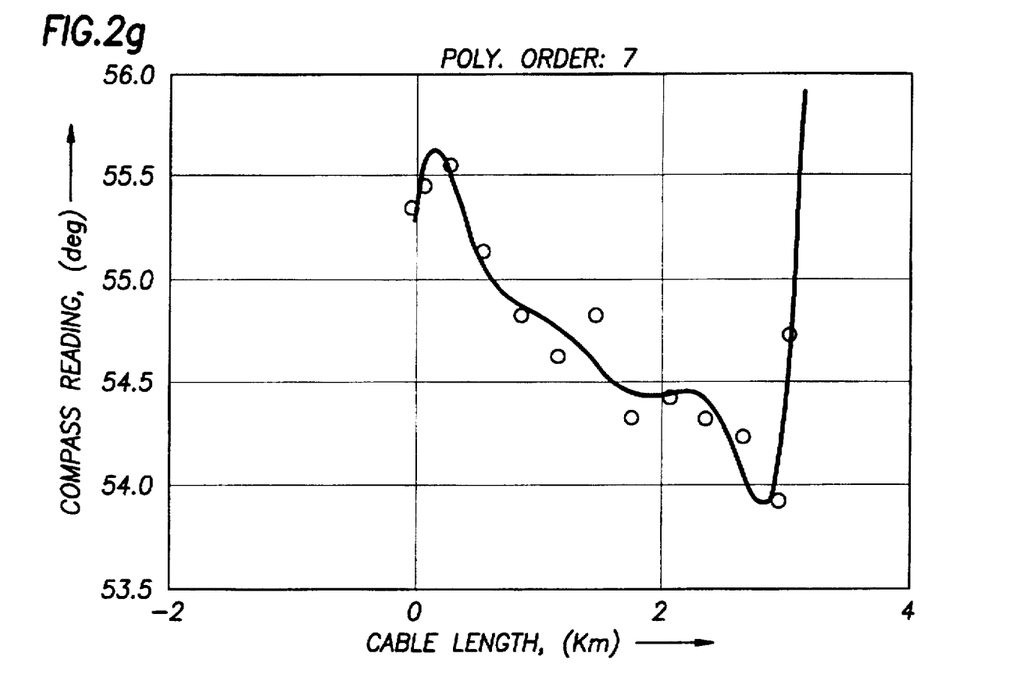
Figure 2H:
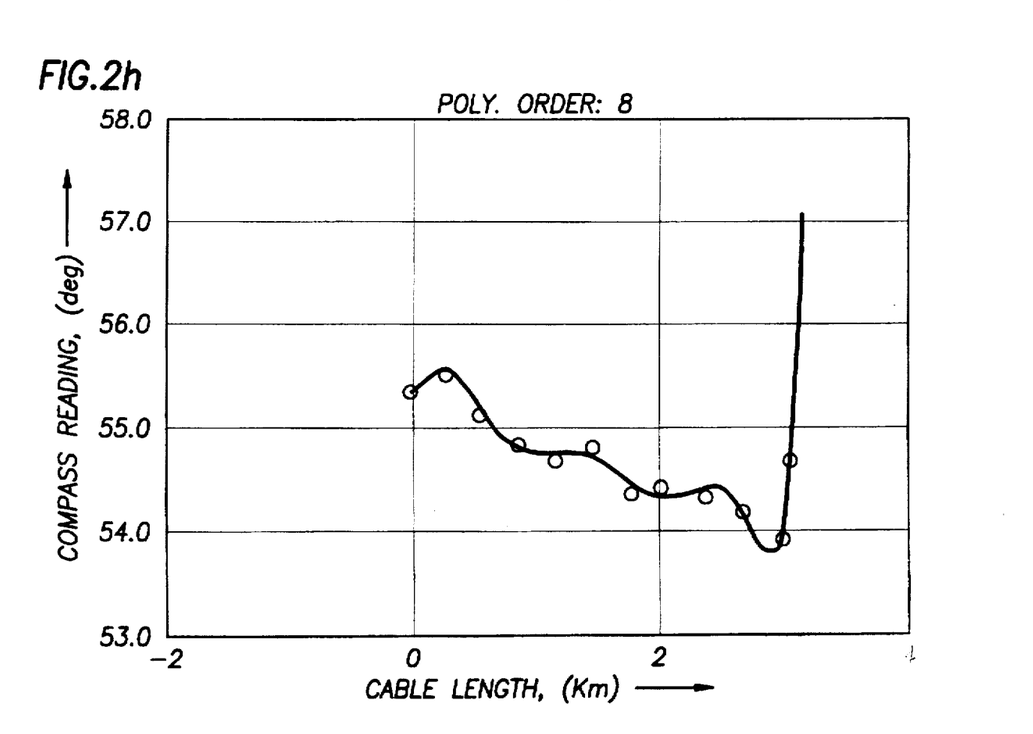

FIG. 1 describes the reference frame of the streamer compass modeling used. The present invention uses an "n-order" polynomial which leads to a curve that describes the complete streamer shape, using only one set of coefficients, and furthermore resulting in a continuous curve which is continuously differentiable at every point of the cable. The polynomial observation equation is given as:

$$B_i = a_0 + a_1 l_i + a_2 l_i^2 + \ldots + a_n l_i^n \tag{1}$$

where $B_i$ is the i-th compass observation; $l_i$ is the offset of the i-th compass from its reference point; $a_0, a_1, \ldots a_n$ are the polynomial coefficients; n is the polynomial order. The solution of this equation system, using a least squares method, gives the values of the polynomial coefficients. Referring to FIG. 1, we have $$\theta_{(rad)} = \operatorname{atan}(dv/du) \cong \operatorname{atan}(dv/dl) \tag{2}$$

which for any $\theta$ in $(-1°, 1°)$ becomes $$\theta_{(rad)} \cong \tan\theta = dv/du \cong dv/dl \tag{3}$$

Also for $$B > B: B_i = B + \theta = B + (dv/dl)$$

$$B < B: B_i = B - \theta = B + (-dv/dl) \tag{4}$$

where $\theta$ represents the deviation of the mean bearing; the subscript rad represents the units of measure; $dv$ and $dl$ represent incremental compass offsets in the u and v axes repectively.

Substitution, integrating, and re-arranging the above mathematical equations results in:

$$v = c_0 l + c_1 l^2 + \ldots + c_n l^{(n+1)} \tag{5}$$

where:

$$c_k = a_k/(k+1),$$

for k=0 to n

The final coordinates of X,Y position of any point of interest of the cable is estimated using:

$$X = \cos(\alpha) l + \sin(\alpha) v \tag{6a}$$

$$Y = \sin(\alpha) l - \cos(\alpha) v \tag{6b}$$

Upon reference to FIG. 1, FIG. 2, and the forefoing equations and graphs, those skilled in the art will appreciate that the use of polynomial approximation is a realistic approach to the streamer shape problem. Polynomials of order four or less do not accurately describe the observations. In such cases the differences between actual compass readings and those predicted by the polynomial can in a few cases exceed half a degree. This might be important given that, in practice, cable compass resolution, not its accuracy, can be as high as 0.1 degree. Furthermore, polynomials of order greater than six do sometimes generate curves characterized by steep changes of gradient, which may affect significantly the fidelity of the final coordinate. This phenomenon is particularly noticeable for compasses close to the tailbuoy.

The invention uses two mathematical models consisting of a measurement or primary model which relates the state vector parameters to the observations, and the dynamic or secondary model which relates the parameters at epoch $t_{i-1}$ to those at a later epoch $t_i$. The linear form of a non-linear measurement system is given by:

$$A_i X_i = b_i + v_i \tag{7}$$

where $A_i$ is the design matrix, $X_i$ is the correction to the provisional values of the filtered state vector, $b_i$ is the observed minus computed vector given by $L_i - F_i(X_i(+))$, $v_i$ represents the state vector residuals, and L the observations. The dynamic model represents the behavior of the system as it varies with time. The discrete linearized form is given by:

$$X_i = M_{i-1} X_{i-1} + y_{i-1} \qquad (8)$$

where $M_{i-1}$ is the transition matrix from time $t_{i-1}$ to time $t_i$, $y_{i-1}$ is the dynamic model noise from time $t_{i-1}$ to time $t_i$.

The present invention combines several sub-systems that are able to move independently of each other and of the vessel. These sub-systems include every streamer, gun array, or any auxiliary reference station. Each sub-system is then linked by a mathematical model to define the complete network configuration.

Referring now to FIG. 1, the system has its origin at the vessel navigation reference point with the X-axis aligned with the east direction, and defined by points 1 and 3, while the Y-axis is aligned northwards, defined by points 1 and 2. This system moves with respect to a geodetic earth system as the vessel's position changes. Furthermore, given the relatively short distances involved within the network, there will be minimal error in working with the computed distances and azimuths in the XY plane. The earth is effectively considered to be flat within the region of the seismic spread. Some of the available observations are made relative to the devices fixed on the vessel. For this reason, another coordinate attached for the vessel is defined. The origin of this system coincides with the navigation reference point. Its y axis is aligned with the vessel's bow-stern direction and is defined by points 1 and 5. Its x axis is in the horizontal plane, is perpendicular to the y axis, and is defined by points 1 and 4. The z axis is defined to be perpendicular to the xy plane upwards.

Finally, in order to estimate the position of any point on each streamer, taking in account its distance from the streamer reference point, a local reference frame for each streamer within the spread is introduced (u,v,z). Each has its origin at the head of the first active section of the streamer, or any other point of known offset. Its u axis is aligned with the base course of the cable and its v axis perpendicular to the u axis and pointing to the starboard side (the right-hand side of a ship as one faces forward). The z axis is defined such that the resultant coordinate system is right-handed. The u axis is defined by points 6 to 14, and the v axis is defined by points 6 to 8.

Figure 3:
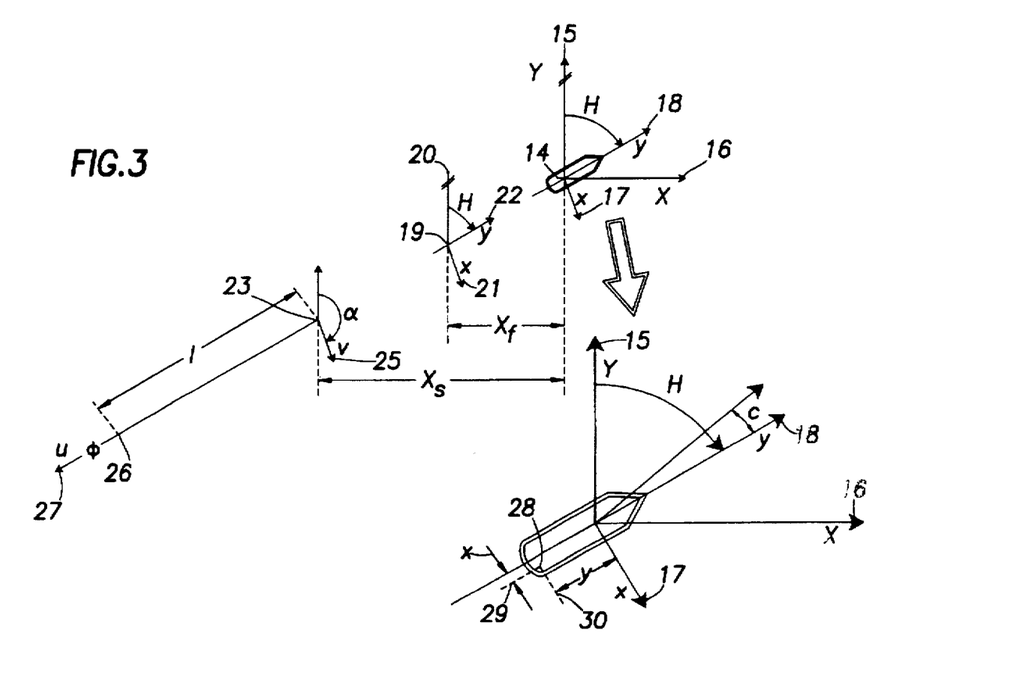
FIG. 3 depicts a a local topographic coordinate system.

Referring now to FIG. 3, points 14 to 15, and points 14 to 16 define the overall grid system for the method of the present invention. Points 14 to 18, and points 14 to 17 define the local vessel coordinate system. Points 19 to 21 and points 19 to 20 define the air gun coordinate system. Points 23 to 25 and points 23 to 27 define the streamer coordinate system. Points 28 to 30 and points 28 to 29 define the vessel-mounted laser coordinate system. The method of the present invention can accomodate multiple vessels, multiple streamers, and multiple air guns.

Figure 4:
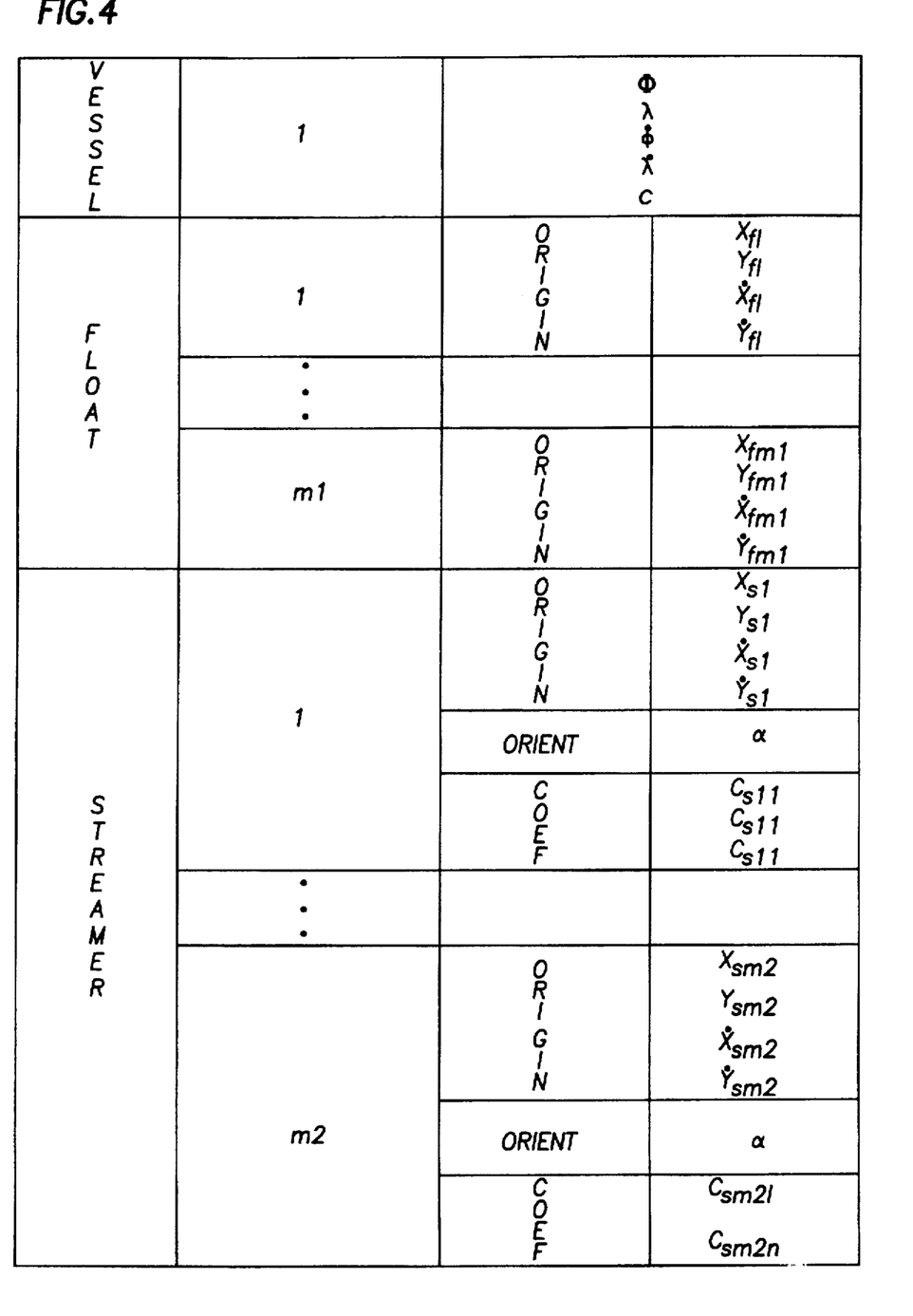
FIG. 4 depicts diagrammatically the state vector of the Bayes filter algorithm.

Referring now to FIG. 4, in order to implement the Bayes filter, the method of the present invention defines the state vector which constitutes the minimum number of individual determinable parameters necessary to describe the compete system. In the case of typical navigation networks, the unknowns consist of the vessel's position, its motions, and the motion of each sub-system within the spread. In the following, the unknown parameters are classified by its sub-system.

Vessel unknowns are defined to be instantaneous values to the elements where $\Phi$, $\lambda$ represents the geodetic ellipsoidal coordinates of the ship reference point; $\dot{\Phi}$, $\dot{\lambda}$ represents the instantaneous velocity of this point and c represents the crab angle.

The unknown parameters for any tow points attached to the vessel are included in the state vector. Tow point positions are defined as position vectors expressed in X,Y coordinates along with their velocity components X,Y with respect to their local topographic coordinate system. The Z component is taken into account by making geometric corrections to the observations.

The streamer unknown parameters for any point on the streamer in terms of its reference frame is given by:

$$u = 1 \qquad (9a)$$

$$v = c = c_2 l^2 + c_3 l^3 + \ldots + c_n l^n \qquad (9b)$$

The coefficient $c_0$ is set to null because v is zero at the head of the cable where l is equal to zero. Furthermore, the coefficient $c_1$ which is directly related to the overall orientation of the streamer is redundant in the state vector because the orientation of the u, v system, the direction angle, in FIG. 3 is considered to be an unknown in the system. The streamer parameters therefore consist of the polynomial coefficients $c_i$, the direction angle $\alpha$ of the v axis, and the streamer coordinate reference system origin X,Y, along with its velocity components X,Y.

The number of states to be estimated for every shotpoint depends on the number of floats and streamers that are utilized throughout the spread as well as depending on the polynomial order of the streamer model. Thus for a configuration consisting of m1 floats, m2 streamers, and for an n-th order polynomial, the state vector dimensions will be 5+4(m1+m2)+nm2, which for a typical spread of two air guns and three streamers becomes forty elements. The tailbuoys do not form part of the state vector, because they are treated as simple extensions of the streamer, and they serve to provide overall orientation and scale control for the cables.

Once the different observation types have been identified and the state vector parameters explicitly defined, the measurement functional model is set up in the form of observation equations. The observation equations are mathematical representations of the underlying physical and geometric relations between the measured quantities and the unknown parameters.

The vessel's geodetic position, being an unknown parameter, is given by $$\Phi_v = \Phi + v_\Phi \qquad (10a)$$

$$\lambda_v = \lambda + v_\lambda \qquad (10b)$$

where $\Phi_v$, $\lambda_v$ are the unknown ellipsoidal coordinates, $\Phi$, $\lambda$ are the observed ellipsoidal coordinates of the vessel, and $v_\Phi$, $v_\lambda$ are the measurement residuals. If the sensor that provided the vessel's position is located sufficiently far away from the navigation reference point, the observations to this point are corrected by the formulae given in equations 16, 17, and 19.

The vessel's gyro is related to the velocity of the vessel via the crab angle as follows:

$$\tan^{-1}[E/N] + c = H + v_h \qquad (11)$$

$$\tan^{-1}[v\cos(\Phi)\dot{\lambda}/\rho\dot{\Phi}_v] + c = H + v_H \qquad (12)$$

where H is the observed gyro measurement, E is the instantaneous easterly velocity of the vessel, N is the instantaneous northerly velocity of the vessel, c is the crab angle of the vessel and $v_H$ is the measurement residual of the gyro and:

$$v = \frac{a}{[1 - e^2 \sin^2(\phi)]^{1/2}} \qquad (13a)$$

-continued $$\rho = \frac{a(1-e^2)}{[1-e^2\sin^2(\phi)]^{3/2}} \quad (13b)$$

$$e^2 = \frac{a^2 - b^2}{a^2} \quad (13c)$$

with $\alpha$ as the semi-major axis of the reference ellipsoid and b as the semi-minor axis of the reference ellipsoid.

The observation equations for measured distances and azimuths are given as:

$$\sqrt{(X_j - X_i)^2 + (Y_j - Y_i)^2 + (Z_j - Z_i)^2} = D_{ij} + v_{Dij} \quad (14)$$

$$\tan^{-1}[(X_j - X_i)/(Y_j - Y_i)] = A_{ij} + v_{ij} \quad (15)$$

where $X_i, x_j$ are the easting components of stations i and j, $Y_j$, $Y_j$, are the northing components of stations i and j; $Z_i$, $Z_j$, are the height components of stations i and j; $D_{ij}$ is the measured distance between stations i and j, $A_{ij}$ is the measured or reduced azimuth between stations i and j; $v_{Dij}$ and $v_{Aij}$ are the residuals of the measurement residuals of the distance and azimuth respectively. The Cartesian coordinates of the stations i an dj are expressed in a different form in accordance to their referenced sub-system. Three different cases are considered. If a station i is a point on the vessel then:

$$X_i = \chi\cos(H) + y\sin(H)$$

$$Y_i = -\chi\sin(H) + y\cos(H) \quad (16)$$

where x,y are the coordinates of the device fixed on the vessel;H is the vessel's heading. Given that the vessel's heading H is not considered to be unknown in the system, it is substituted in equation (16) as:

$$H = \tan^{-1}[v\cos(\Phi_v)\lambda/\rho\Phi_v] + c \quad (17)$$

so that the observation relates only to the unknown parameters. Similarly, if a station i is a device on a float array, the observation is first corrected to the center of the array using equations 16 and 17. In this case, the orientation of the device is assumed to coincide with that of the vessel's gyro, and also the xy coordinates in equation 16 are referred to by the nominal offsets of the device measured from its center. If a station is any point of a streamer, in order to express $X_i$, $Y_i$ coordinates as a function of only the unknowns, its equation is given by:

$$X_i = X_s + l\cos(\alpha) + \sum_{k=2}^{n} [c_k l^k]\sin(\alpha) \quad (18)$$

$$Y_i = Y_s - l\sin(\alpha) + \sum_{k=2}^{n} [c_k l^k]\cos(\alpha)$$

where $X_s, Y_s$ are the Cartesian coordinates of the streamer's reference point in the XY coordinate system; $\alpha$ is the instantaneous orientation of the streamer coordinate system (u,v); $c_k$ are the polynomial coefficients; n is the order of the polynomial; and l is the offset of the station i from the streamer's reference point.

For any float being towed by the vessel, except tailbuoys, observation equations are as follows:

$$\phi_v + \frac{Y_f}{\rho} = \lambda_f + v_{\phi f} \quad (19a)$$

$$\lambda_v + \frac{X_f}{v\cos(\phi_v)} = \lambda_f + v_{\lambda f} \quad (19b)$$

where $X_f, Y_f$ are the unknown Cartesian coordinates of the float; $\Phi_v$, $\lambda_v$ are the unknown ellipsoidal coordinates of the vessel; $\Phi_f$, $\lambda_f$ are the observed geodetic coordinates of the float; and $v_{\phi f}$, $v_{\lambda f}$ are the measurement residuals. These equations are based on the assumption that the radius of curvature in the plane of the meridian $\rho$, and the prime vertical $v$ throughout the spread are equal to those for the reference navigation point.

For tailbuoy positions, the observation equations are derived via the streamer parameters as:

$$\phi_v + \frac{Y_s - l\sin(\alpha) + \sum_{k=2}^{n} [c_k l^k]\cos(\alpha)}{\rho} = \phi_{tb} + v_{\phi_{tb}} \quad (20a)$$

$$\lambda_v + \frac{X_s + l\cos(\alpha) + \sum_{k=2}^{n} [c_k l^k]\sin(\alpha)}{v\cos(\phi_v)} = \lambda_{tb} + v_{\phi_{tb}} \quad (20b)$$

where $\Phi_{tb}$, $\lambda_{tb}$ are the tailbuoy measured geodetic coordinates, and $v_{\Phi_{tb}}$, $v_{\lambda_{tb}}$ are the measurement residuals.

The observation equation for a compass of offset l, measured from the streamer reference point, is given as follows:

$$\alpha - [\tan^{-1}(dv/du) + \pi/2] = B_{comp} + v_{comp} \quad (21)$$

where $\alpha$ is the instantaneous orientation of the streamer coordinate system(u,v), $B_{comp}$ is the observed compass bearing; $v_{Bcomp}$ is the measurement residual, and $$\frac{dv}{du} = \frac{d\left(\sum_{k=2}^{n} c_k l^k\right)}{dl} = \sum_{k=2}^{n} [kc_k l^{k-1}] \quad (22)$$

The compass observations are reduced to the grid before incorporating them into the filtering process. This is done by correcting them for magnetic declination and grid convergence according to the following equation:

$$B_{comp} = B + \text{mag\_decl} + \text{grid\_conv} \quad (23)$$

Therefore, combining equations (21), (22), and (23), the complete form is:

$$\alpha - \left[ \tan^{-1}\left( \sum_{k=2}^{n} [kc_k l^{k-1}] + \frac{\pi}{2} \right) \right] - magdecl - gridconv = B + v_B \quad (24)$$

An advantage of the present invention is that the magnetic declination can be placed in the state vector, and recovered from the measurement along with all of the other parameters.

Figure 5:
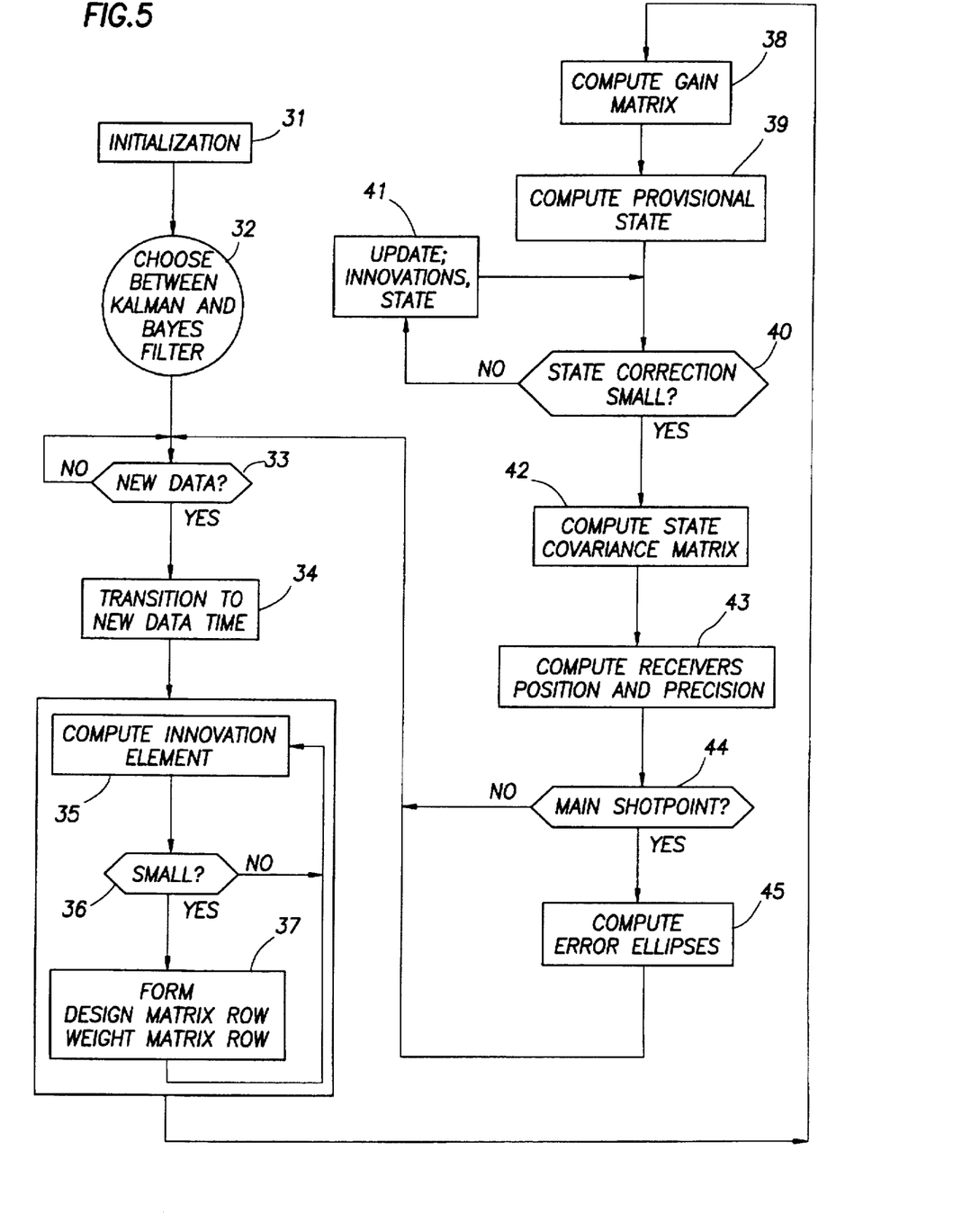
FIG. 5 is a flow diagram showing the method steps of the present invention.

Referring now to FIG. 5, showing the method of the present invention, step 31 is the initialization. In step 32, the user is presented with the choice of filter type to be used in processing the data. In step 33, data acquired from the various navigational devices are logged into the computer system. In step 34, the new navigation data's state vector and its covariance matrix is transitioned to the next time event, based entirely on the dynamic model. The transition equations are given as:

$$\chi_i(-) = M_{i-1}\chi_{i-1}(+)$$

$$C_{\chi i}(-) = M_{i-1}C_{\chi i-1}(+)M_{i-1}^T + T_{i-1}C_{g i-1}T_{i-1}^T \quad (25)$$

where i denotes the current time event, $\chi$ represents the state vector, $C_x$ is the covariance matrix of the state vector, M is the transition matrix; $C_g$ is the covariance matrix of the driving noise for forcing function g that represents the dynamic model, g is the vector quantities which cause the dynamic model to be incorrect, and T is a coefficient matrix chosen such that $T_g$ represents the effect of g on the state vector.

In step 35, the predicted residuals or innovations to the measured observations and their associated covariance matrix are computed as:

$$v_i(-)=b_i-A_i\chi_i(-)$$

$$C_{v_i}(-)=C_{l_i}+A_iC_{\chi_i}(-)A_i^T \qquad (26)$$

where $C_l$ is the covariance matrix of the measured observations, A is the design matrix that represents the geometric and physical relationship between the measured quantities and the unknowns.

The predicted residuals are computed from the difference between the measurements at a particular time and the measured quantities computed from the predicted state of the system. In step 36, the innovations are statistically and iteratively examined in order to reject outlying observations. The symbols (−) and (+) following a vector or matrix denote the values of that vector or matrix at the instance in time before and after the measurement update, respectively.

In step 37, the design matrix and the weight matrix are computed. Due to the complex nature of most of the observation equations, the design matrix is never derived in an analytical way. The elements of the matrix are computed numerically.

Figure 6:
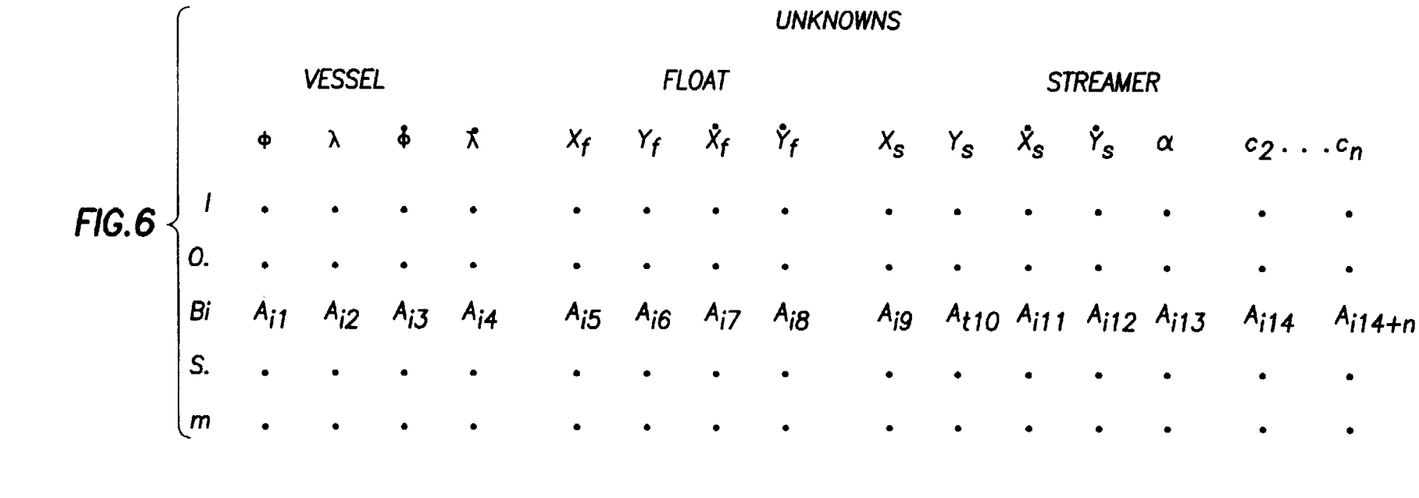
FIG. 6 depicts a design matrix for the i-observation.

Referring to FIG. 6, the design matrix for the i-observation, for a configuration of one float and one streamer and m-obsevation equations is given. The elements of the design matrix for the i-observation are as follows:

$$A_{i1}=\frac{\partial F_i(x)}{\partial \phi}, \quad A_{i2}=\frac{\partial F_i(x)}{\partial \lambda}; \qquad (27)$$

$$A_{i3}=\frac{\partial F_i(x)}{\partial \phi}$$

where $F_i(x)$ is the raw non-linear observation equation of the i-measurment, and x is the state vector. Once an observation i becomes available, the state vector solution from the previous equation is used to compute the value of the observed data at time j, denoted by $F_i(x)_{ij}$. Thus, in order to compute the elements of the design matrix numerically, the quantity $F_i(x+\delta x)_{ij}$ is computed recursively for every single element of the state vector. $\delta x$ denotes small changes in the system states. Finally, the element $A_{jk}$ of the design matrix for the k element of the state vector with respect to i-observation is given as:

$$A_{ik}=\frac{F_i(x_k+\delta x_k)_{ij}-F_i(x_k)_{ij}}{\delta x_k} \qquad (28)$$

Referring again to FIG. 5, in step 38 the gain matrix is computed by:

$$C_{\chi_i}(+)=[(C_{\chi_i}(-))^{-1}+A_i^TC_{l_i}^{-1}A_i]^{-1} \qquad (29)$$

where $K_i$ is the gain matrix which controls the amount of the predicted state and its associated covariance matrix as affected by the measurements. Those skilled in the art will appreciate that the above is less complex in solving for the gain matrix as compared to a standard Kalman gain matrix manipulation, whereby it is computed as:

$$K_i=C_{\chi_{i-1}}(-)A_i^T[A_iC_{\chi_{i-1}}(-)A^T+W_i^{-1}]^{-1} \qquad (30)$$

It is important to realise that for any one cycle of the filter the only conversion occurs in the computation of the gain matrix when it is necessary to invert:

$$A_iC_{\chi_{i-1}}(-)A^T+W_i^{-1}$$

This matrix will have a size equal to the number of observations in the new measurement model.

In step 39, following the computation of the gain matrix, the provisional state vector corrections are computed as:

$$\hat{\chi}_i^{k-1}=\hat{\chi}_i(-)+G_i^{k-1}[l_i\text{-comp}(\hat{\chi}_i^{k-1}(+))-\partial_\chi A_i^{k-1}(\hat{\chi}_i(-)-\hat{\chi}_i^{k-1}(+))] \qquad (31)$$

where $\delta_\chi A_i^{k-1}$ is the Jacobean matrix of the design matrix $A_i^{k-1}$ computed for the k−1 iteration; $l_i$-comp$(x^{k-1}(+))$ is the 'observed-computed' vector $b_i^{k-1}$. In steps 40, 41, and 42, the gain matrix is computed iteratively while updating the innovations and its covariance matrix as follows:

$$v_i(-)=b_i-A_i\chi_i(-)$$

$$C_{v_i}(-)=C_{l_i}+A_iC_{\chi_i}(-)A_i^T \qquad (32)$$

In step 43 the coordinates of the hydrophone groups are computed using equations 18, whereas the coordinates of the center of the floats are states in the system (no further computations are required). In step 44, the computer completes the cycle of shooting the air guns, collecting the data, and computing the locations of the air guns and hydrophones. In step 45, the quality of the computed locations is determined.

The foregoing description is directed to a particular embodiment of the invention for illustration and explanation. It will be apparent, however, to one skilled in the art that many modifications and changes to the embodiment set forth above are possible without departing from the scope and spirit of the invention. It is intended that the following claims be interpreted to embrace all such modifications and changes.

What is claimed is:

1. A method of computing the location of air guns and hydrophones within a seismic spread utilizing a navigation network having a plurality of stations, the network providing a plurality of navigation observations, a number of the observations consisting of magnetic bearings used to derive the hydrophone locations, the method comprising the steps of:

c. obtaining a set of observations from the network, each observation being obtained by using navigation devices whose origin system moves independent of the navigation reference point; and d. forming a design matrix wherein the magnetic bearings are modeled based on the equation:

$$\alpha - \left[ \tan^{-1}\left( \sum_{k=2}^{n} [kc_k t^{k-1}] + \frac{\pi}{2} \right) \right] - magdecl - gridconv = B + v_B.$$

2. The method of claim 1, before the step of forming a design matrix, further comprising the step of transitioning new data to event time.

3. The method of claim 2, after the transitioning step, and before the step of forming a design matrix, further comprising the step of computing innovations to the measurements and discarding outlying observations..

4. The method of claim 3, after the step of forming a design matrix, further comprising the step of solving for a state vector to yield the locations of the air guns and the hydrophones.

5. The method of claim 4, after the step of solving for a state vector, further comprising the step of computing reliability and precision quantities.

6. A method of computing the location of air guns and hydrophones within a seismic spread utilizing a navigation network having a plurality of stations, the network providing a plurality of navigation observations, a number of the observations consisting of magnetic bearings used to derive the hydrophone locations, the method comprising the steps of:

(a) obtaining a set of observations from the network, each observation being obtained by using navigation devices whose origin system moves independent of the navigation reference point;

(b) transitioning new data to event time;

(c) computing innovations to the measurements and discarding outlying observations; and (d) forming a design matrix wherein the elements of the design matrix for the ith observation are determined by the following equations:

$$A_{i1} = \frac{\partial F_i(x)}{\partial \phi}, \quad A_{i2} = \frac{\partial F_i(x)}{\partial \lambda};$$

$$A_{i3} = \frac{\partial F_i(x)}{\partial \phi}$$

where $F_i(x)$ is the raw non-linear observation equation of the i-measurement, and x is the state vector.

* * * * *

UNITED STATES PATENT AND TRADEMARK OFFICE
CERTIFICATE OF CORRECTION

PATENT NO. : 5,761,153
DATED : June 2, 1998
INVENTOR(S) : Vassilis Nicholas Gikas et al It is certified that error appears in the above-identified patent and that said Letters Patent is hereby corrected as shown below:

Col. 8, line 66, "$T_{i-1}^T$" should be $-T_{i-1}^T-$.

Col. 9, line 14, "$A_i^T$" should be $-A_i^T-$.

Col. 9, line 52, "$A_{jk}$" should be $--A_{ik}--$.

UNITED STATES PATENT AND TRADEMARK OFFICE
CERTIFICATE OF CORRECTION

PATENT NO. : 5,761,153
DATED : June 2, 1998
INVENTOR(S) : Vassilis Nicholas Gikas, et al.

It is certified that error appears in the above-identified patent and that said Letters Patent is hereby corrected as shown below:

Col. 6, line 10,   "$v=c=c_2 l^2$"   should be   -- $v = c_2 l^2$ --.

Col. 6, line 45,   "$\lambda_v \lambda$"   should be   -- $\lambda_v = \lambda$ --.

Col. 7, line 46,   "$Y_i 5$"   should be   -- $Y_i$ --.

Col. 8, line 65,   "$M_{i-1}{}^T$"   should be   -- $M_{i-1}{}^T$ --.

Signed and Sealed this

Second Day of March, 1999

Attest:

Q. TODD DICKINSON

*Attesting Officer*   *Acting Commissioner of Patents and Trademarks*